Oct. 25, 1932.  C. J. WILLENBORG, JR  1,884,458
DRAW-OFF VALVE
Filed April 13, 1929  2 Sheets-Sheet 2
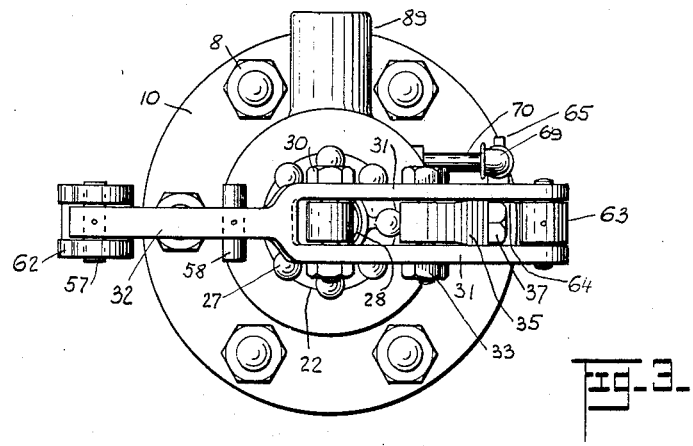
Fig-3-
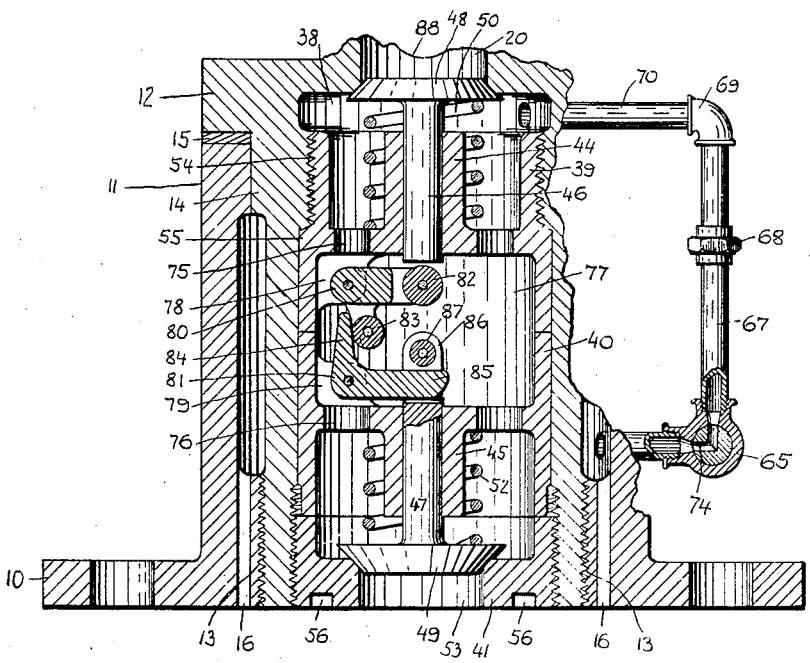
Fig-4-
INVENTOR.
CARL J. WILLENBORG JR.
BY
Rudolf Wildermann
his ATTORNEY.

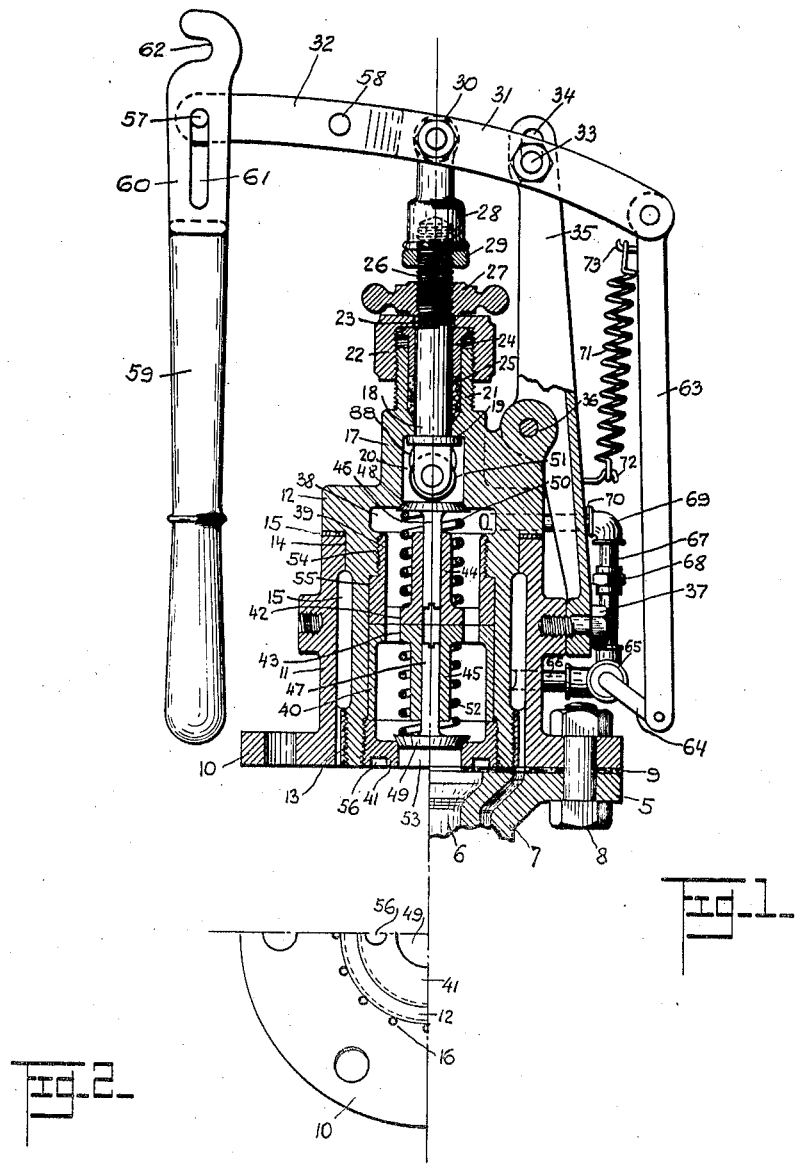

Patented Oct. 25, 1932

1,884,458

UNITED STATES PATENT OFFICE

CARL J. WILLENBORG, JR., OF HOBOKEN, NEW JERSEY, ASSIGNOR TO UNITED STATES FIRE PROTECTION CORPORATION, OF HOBOKEN, NEW JERSEY, A CORPORATION OF DELAWARE

DRAW-OFF VALVE

Application filed April 13, 1929. Serial No. 354,756.

My invention relates to valves which serve to draw liquids from a source of supply. It refers in particular to liquids which are dangerous or obnoxious to handle because they are poisonous, inflammable or explosive; and some of the objects of my improvements are, to provide a valve which, first, prevents leaking or dripping of the liquid passing therethrough; second, prevents contact of the liquid with the air before it reaches the point at which it is actually drawn off; third, to provide a protective zone of a non-oxidizing, neutral or inert gas around the liquid as it passes through my valve; fourth, to provide such a gas between the liquid and the point of draw-off while the valve is not in use; fifth, to provide in such a valve an intermediate chamber which is normally under the pressure of a non-oxidizing, neutral or inert gas and the ports of which are secured in a closed position by the pressure of said gas; sixth, to provide means on said valve which automatically prevent a reaction of the pressure of said gas in said chamber through the inlet port in the direction from which said liquid is supplied to said valve; seventh, to shut off automatically the supply of said gas to my valve, when my valve is in operation and to release the pressure of said gas in said chamber of my valve so as to allow entrance of the liquid into the valve through the inlet port; eighth, to provide in such a valve simple means for automatically shutting off the supply of gas and for opening, in rotation, the ports of inlet and outlet of my valve, when the valve is set into operation; ninth, to provide an automatic reversal of procedure when my valve is shut off; tenth, to combine in such a valve the features required for the safety of its operation with an extremely simple method of constructing said valve; eleventh, to provide on my valve means for the operation of said valve which cannot be locked in an open position by the operator.

These and other objects I attain in the construction of my leak-proof, anti-drip, draw-off valve by the means indicated and illustrated in the accompanying drawings, in which, Figure 1 shows a sectioned side elevation of my improved valve. The levers required for the operation of the valve are not sectioned.

Figure 2 shows a corresponding sectional bottom view.

Figure 3 shows a corresponding top view.

Figure 4 shows, in a sectioned, sectional side elevation, a slightly modified form of execution of my invention. Whereas the section is made substantially along a center line, parts on the right side of the drawings, in particular the gas cock and some of the pipes used for the supply of a non-oxidizing, neutral or inert gas in my improvements are sectioned along their center line.

Similar numerals refer to similar parts throughout the various views.

A fitting of the kind normally used in pipes and on other means conveying liquids, which my invention has reference to, is shown in sectional section at 5 in Figure 1. This fitting 5 comprises an inner compartment 6 and an outer, substantially concentrically disposed compartment 7. The fitting 5 is fastened by bolts 8, with a gasket 9 in between, against the flanged lower end 10 of the outer shell 11 of my valve. The outer shell 11 is screwed onto the body 12 of the valve by means of threads 13. A round rim 14 on the inside of the shell 11, at its upper end, slidably fits over a correspondingly shaped shoulder on the body 11 and a gasket 15 is provided between the shell and the body where they abut upon each other, in a horizontal plane. Between the shell and the body I provide a gas jacket to which the gas contained between the inner compartment 6 and the outer compartment 7 of the fitting 5 has admittance through a number of holes 16; these holes extend vertically in shell 11, next to thread 13, and are arranged in a circle concentric to said thread.

From the top of the body 12 extends a hub 17 in which is slidably arranged the arbor 18. A shoulder 19 on the end of said arbor 18 is adapted to seat against the bottom of a hole 20 which is countersunk in said hub 17. The upper end 21 of hub 17 is threaded on its outside. A cap 22, threaded on the inside, engages said threaded end 21 of hub 17. A clearance hole 23 for arbor 18 is provided in the bottom of said cap and a sleeve 24 slidably abuts against said bottom of said cap and is slidably fitted along its cylindrical periphery into a hole countersunk into end 21 on hub 17. Below said sleeve 24 said countersunk hole is filled with a packing 25 so that a leak-proof seal can be maintained around arbor 18 at all times by adjustment of the cap 22. Above the cap 22 is screwed onto the threaded end 26 of arbor 18 a nut 27 which is provided with suitable gripping means for the hand and which, when screwed down, serves to lock the valve in a closed position.

Onto the threaded end 26 of arbor 18 is screwed a cup 28 which is set on the end of said arbor by a lock nut 29. The upper end of said cup is shaped to be hinged onto a bolt 30 which extends across the forked ends 31 of lever 32. Another bolt 33, which also extends across the forked ends 31 of lever 32, is slidable in a vertical slot 34 in the upper end of upright 35, said upper end being slidably retained between the forked ends 31 of lever 32. The upright 35 is rigidly mounted on the body 12 and the shell 11 of the valve by a bolt 36 and by a screw 37, respectively.

Below the countersunk hole 20 there is a larger recess 38 on the inside of body 12. In said recess 38 are seated an upper plug 39, a center plug 40 and a bottom plug 41. The upper plug 39 and the center plug 40 represent cups, the bottoms of which, 42 and 43, abut upon each other and are perforated by openings; said openings in the two bottoms substantially register with each other and are circularly arranged around hubs 44 and 45, which extend up and down, respectively, in said cups from their bottoms 42 and 43. The hubs 44 and 45 have holes in their centers in which are slidably arranged the stems 46 and 47 of the poppet valves 48 and 49, respectively. The valve 48 is tensioned upward by a compression spring 50, which rests upon the bottom 42 of the upper plug 39 and which is retained in vertical position by the hub 44. Said valve 48 is adapted to seat in the chamfered edge at the entrance of the countersunk hole 20 and it is adapted to be engaged by the arbor 18, upon the downward stroke of said arbor, by means of a roller 51, which is rotatably mounted in the slotted lower end of said arbor. The compression spring 52, which extends between the bottom 43 of the center plug 40 and the shoulder of the lower valve 49, and which is centrally guided by hub 45, is lighter than spring 50. That spring 52 tensions the lower valve 49 downward into a valve seat upon the hole 53 in the bottom plug 41.

The three plugs 39, 40 and 41 are seated in the recesses 38 of body 12 in the following manner. The upper end of the upper plug 39 is threaded and screwed into the threaded rim 54 on the inside of the recess, a shoulder 55 on said plug 49 resting in abutment against the lower end of said rim 54. The center plug 40 is of the same diameter as the shoulder 55 and rests against said shoulder, in abutment, in the recess in the body 12. Below the center plug 40 the wall of the recess is threaded, and into said threaded end of the recess is screwed the bottom plug 41; holes 56, which are provided upon the lower face of the bottom plug 41, provide means by which the plug 41 may be gripped by a suitable tool for the purpose of tightening said plug in the body.

Two studs 57 and 58 extend from lever 32, on both sides of said lever. The handle 59 is forked at its upper end 60 and the lever 32 fits between said forked ends 60. By means of slots 61 in said forked ends 60 the handle 59 is hinged upon stud 57. At the very end of the handle the forked ends 60 have the shape of hooks and the recesses 62 provided thereby are adapted to engage the stud 58, when the handle 59 is swung, in clockwise direction, around stud 57, to a position slightly above a horizontal level and is then pushed to the right, the pin 57 sliding to the other end of slot 61 so that the recesses 62 register with stud 58 and may be engaged thereupon.

It is customary to place valves of this kind in a housing, the housing accommodating the valve as shown in Figure 1 and the door of said housing being arranged to open towards the left so that the operator has handle 59 in front of him when he opens said door. When handle 59 is brought into an operative position, it extends substantially horizontally from said housing through said door. The door can therefore not be shut when the handle is in an operative position and the operator is obliged to disengage the hook on the end of the handle from stud 58 and to return the handle into its normal, substantially vertical position, before he can close the door of said housing.

Onto the very end of the forked ends 31 of lever 32 is hinged the connecting rod 63, the lower end of which rotatably connects to the operating lever 64 of cock 65. Cock 65 is an angle cock connecting by a horizontal nipple 66 to gas chamber 15 and connecting by the vertical pipe line 67 with coupling 68 through elbow 69 to another horizontal pipe 70 which opens into the recess 38 of the body. A tension spring 71 extends between a hook 72 on the upright 35 and a hook 73 on the connecting rod 63. By tension spring 7 the lever 32 is normally retained in its position of furthest clockwise rotation around bolt 30, bolt 33 resting in the bottom of slot 34. When the valve is operated by handle 59, the lever 32 at first, owing to the strong tension of spring 50 on the upper valve 48,—swings in counterclockwise direction around bolt 30, the connecting rod 32 pulling the operating lever 64 of cock 65 upward, so that the cock which is normally opened is shut off. When the lever 32 has rotated around bolt 30 in this manner to such a distance that the bolt 33 is moved up in slot 34 to a position of rest at the upper end of said slot, then the rotation of lever 32 around bolt 30 is stopped and it starts to rotate around bolt 33, bolt 30, connected by cap 28 to arbor 18, moving said arbor downward and opening valve 48, roller 51 serving as connecting means. When the handle is released, the operation is reversed, lever 32 is swinging around fulcrum 34 and closing valve 48 and subsequently swinging around bolt 30 until cock 65 is shut off. The hole 74 in the cock is very small so that only a fractional movement of lever 64 from its lowest position will shut off the flow of gas through the cock. This is best seen in Figure 4 in which the cock is sectioned through the center.

When both poppet valves, 48 and 49, are open, and the chamber in the valve between said cocks is not under gas pressure, liquid can enter upon the valve, pass through it and enter upon hole 20 in hub 17. A hole 88 laterally extends from said hole 20 towards the side in the rear of Figure 1. Said hole 88 extends through the length of the hub 89 which forms part of the body 12. The point at which hole 88 emerges from hub 89 may be tapped or otherwise suitably fitted so as to allow the coupling of a hose, a spout or other means to the valve. Thus the liquid drawn from my valve may be suitably dispensed. If the gas is not to be directly dispensed from my valve but if said valve is to serve as a check valve somewhere along the line which carries the liquid, double walls may be suitably provided for on the hub 89 and it may be flanged in a manner corresponding to that of the flange 10 on the inlet of the valve, so that the liquid may be carried in a jacketed line from the valve, in the same manner in which it is carried to my valve.

The modification of Figure 4 is substantially based upon a change of the upper plug 39 and center plug 40. In this modification I have, in place of the bottoms 42 and 43, which in Figure 1, respectively, are located at the lower and upper ends of the cups represented by the upper plug 39 and center plug 40. webs 75 and 76, extending across the inside of said plugs, near their centers, so that another chamber 77 if formed between said webs. The hubs 44 and 45, the arbors 46 and 47, and the compression springs 50 and 52 are correspondingly shortened. Lugs 78 and 79 are provided on plugs 39 and 40, below and above said webs 75 and 76, respectively, onto which are fulcrumed the angle levers 80 and 81. The horizontal arm of angle lever 80 carries a roller 82 and is adapted to be engaged by the flat end of the stem 46 on valve 48, when said valve is pressed downward. By such movement angle lever 80 is rotated in clockwise direction so that the roller 83 on the other arm of said lever pushes the vertical arm 84 on angle lever 81 in a counterclockwise direction, counterclockwise rotation of angle lever 81 swings upward the substantially horizontal arm 85 of said lever, and said arm, extending into a slotted opening 86 on the upper end of stem 47, bears against the roller 87 which is mounted in said slot 86 upon stem 47. Therefore, when the valve 48 is opened by downward movement, said movement is propagated to the angle levers, as soon as the stem of said valve comes to bear upon roller 82, and the upward motion of arm 85 opens the valve 49.

While some functions of the operation of my valve are sufficiently evident from the above description, I like to recapitulate the functions of the valve as a whole so as to properly emphasize the advantages of my novel construction:

The line in which the liquid is carried to the valve being provided with a gas jacket on all sides, as indicated in the fitting 5 on the end of said line, and the outside of my valve being correspondingly jacketed by chamber 15, so that a fracture in the valve or any other kind of leakage therefrom will have to pass through said mantle of gas and will be suitably mixed with or preceeded by said gas when entering upon the air, a full protection for the gas is provided until it reaches the point of exit from my valve. At the point where the fitting 5 is connected to the flanged end 10 of the shell 11, there is a recess in the fitting, below the entrance 53 of the valve. This recess is provided to allow insertion of a filter for the straining of the liquid passing into the valve.

Normally the two poppet valves 48 and 49 are closed, whereas the cock 65 is in an open position, the operating mechanism being substantially in the position of Figure 1, the lever 32 being at rest at its point of furthest clockwise rotation. Cock 65 being open, the gas from the gas jacket 15 may enter upon the inside chamber between the poppet valves through the opening in which pipe 70 issues upon recess 36, and, no matter how much liquid is contained in said recess, some of the gas will be in the inner chamber between the poppet valves. Since the pressure of the gas usually is greater than the pressure at which the liquid is fed to the valve, the pressure exerted by the gas entering upon the inner chamber through pipe 70 will supplement the pressure of the two springs 50 and 52 which hold the poppet valves in closed positions so that seepage through the valve is checked. The actuation of the lever mechanism has been described before. When the lever 32 is started to rotate by means of the handle 59 in a counterclockwise rotation, bolt 33 first moves upward in slot 34 and the cock 65 is shut off. When bolt 33 has reached the top of slot 34, said cock is fully closed; if the operator now continues the operation of the lever 32 in the counterclockwise rotation, the arbor 18 starts to move downward (check nut 27 having been previously screwed upward along thread 26) and the roller 51 on its end engages upon the face of poppet valve 48, presses it down against the spring 50 and opens it. By the opening of poppet valve 48 the pressure of the gas which has been retained therein is released, said gas leaving the inner chamber and entering upon hole 20 from where it leaves the valve through opening 88. As soon as the pressure in the inner chamber is released, the valve 49, which heretofore had been retained in its seat by the combined pressure of said gas and of the light spring 52, is now lifted up by the pressure of the liquid in the line entering upon the valve so that said liquid can now freely pass into my valve and pass out of it from opening 88. The pressure of the liquid entering upon the valve 48 must be, of course, greater than the reaction of the light spring 52 upon poppet valve 49, valve 48 functioning, substantially, like a check valve.

When the operator releases the lever 59, after he has drawn the desired amount of liquid through the valve, poppet valve 46 closes first. Then the poppet valve 49 immediately falls back into its seat, actuated by the pressure of spring 52, since the closing of valve 48 prevents further flow of the liquid through the inner chamber and a pressure is built up therein which is equal to that on the inlet side of the line. When the operator fully releases the lever 59, the cock 65 is opened again and gas is permitted to enter upon the inner chamber through said cock, the pressure of the gas effectively securing valves 48 and 49 in closed positions. If the operator now wants to secure the valves in their normal, closed position he screws the check nut 27 downward on the arbor until said check nut seats tightly upon the cap 22 of the stuffing box.

This description of the opening and closing operations of my valve brings out an important improvement I claim therein, which is the positive closing of two valves on the inner chamber and the securing of said valves in a closed position by the pressure of the gas. Instead of direct operation of poppet valve 48 only,—the operation of poppet valve 49 being brought about by the flow and pressure of the liquid,—I may bring about an operative connection between the two valves in such a manner that the opening of valve 48 is followed by an opening of poppet valve 49, when the valve is open, and by a reversal of these steps, when the valve is closed.

One out of a large number of modifications which may be used to operatively connect the poppet valve 48 and 49 is illustrated in Figure 4:

As soon as poppet valve 48 has been opened, it engages the roller 82 mounted on one of the arms of angle lever 80. Further downward movement of poppet valve 48 therefore swings angle lever 80 in clockwise direction; this movement is transmitted by roller 83 to the angle lever 81 which is caused to rotate in counterclockwise direction. The horizontal arm 85 on angle lever 81 engages the roller 87 mounted in the upper end of the stem of the poppet valve 49, lifts it up and opens it. When the operating lever 32 is released, the procedure is reversed and the poppet valve 49 closes first and is followed by the closing of poppet valve 48, after the arbor 18 has been fully lifted up, the gas cock 65 functioning in this modification of my invention in the same manner as indicated in illustrating the function of the apparatus shown in Figure 1.

Whereas the tension of spring 52 determines the ease with which the valve 49 opens under the pressure of the inflowing liquid in the design of Figure 1, the tension of said spring in the arrangement of Figure 4 is of no particular import since the valve 49 is opened by positive connecting means.

The collateral functioning of the poppet valves 48 and 49 may be brought about by a great variety of mechanical movements, the combination of two angle levers, as shown, being merely illustrative. A tandem arrangement, a pantograph movement or similar mechanisms known in the mechanical arts may readily be substituted to bring about a consecutive opening and closing of the two poppet valves.

For simplicity's sake and also to make the drawings readily understandable, the cock 65 controlling the supply of gas from the gas jacket to the inner chamber is shown in connection with external piping, but it is readily seen that by straight-line connection in the body between the chamber 15 and the inner chamber this may also be brought about, a cock being mounted in the body and interposed in said connection between said chambers, said cock being operated by a mechanism equivalent to the lever, connecting rod and spring parts shown.

Although I have shown and described one form of embodiment of my invention in detail, yet I do not wish to be limited thereby, except as the state of the art and the appended claims may require, for it is obvious that other modifications and changes may be made in the form of embodiment of my invention, without departing from the spirit and scope thereof.

I claim:

1. In a draw-off valve, a chamber, an inlet and an outlet port on said chamber, a poppet valve, on said outlet port and opening into said chamber, a check valve on said inlet port adapted to open into said chamber, a gas cock on said chamber, and means for substantially complimentarily opening and closing said poppet valve and said cock.

2. In a draw-off valve, a chamber, an inlet and an outlet port on said chamber, a poppet valve on said outlet port and opening into said chamber, a check valve on said inlet port adapted to open into said chamber, a gas cock on said chamber and means for substantially complimentarily opening and closing said valves and said cock.

3. In a draw-off valve, a chamber, a gas jacket surrounding said chamber, an inlet and an outlet port on said chamber, a poppet valve on said outlet port and opening into said chamber, a check valve on said inlet port adapted to open into said chamber, a gas cock connecting said gas jacket to said chamber and means for substantially complimentarily opening and closing said poppet valve and said cock.

4. In a draw-off valve, a chamber, a gas jacket surrounding said chamber, an inlet and an outlet port on said chamber, a poppet valve on said outlet port and opening into said chamber, a check valve on said inlet port adapted to open into said chamber, a gas cock connecting said gas jacket to said chamber and means for substantially complimentarily opening and closing said valves and said cock.

5. In a draw-off valve, a chamber, a jacket surrounding said chamber, an inlet and an outlet port on said chamber, a poppet valve on said outlet port and opening into said chamber, a check valve on said inlet port adapted to open into said chamber, a cock connecting said jacket to said chamber and means for substantially complimentarily opening and closing said poppet valve and said cock.

6. A draw-off valve, comprising a chamber, a jacket surrounding said chamber, an inlet and an outlet port on said chamber, a poppet valve on said outlet port and opening into said chamber, a check valve on said inlet port adapted to open into said chamber, a cock connecting said jacket to said chamber and means for substantially complimentarily opening and closing said valves and said cock.

7. The method of controlling the dispensation of a fluid through the chamber of a draw-off valve the inlet and outlet ports of which are closed by poppet valves seated against the inside of the wall of said chamber, comprising supplying a gas to said chamber the pressure of which normally closes said poppet valves, and opening said draw-off valve by pushing the poppet valve closing said outlet port into said valve thus releasing the pressure of said gas in said chamber permitting said fluid to enter upon said chamber through said inlet and to pass therethrough.

8. The method of controlling the dispensation of a fluid through the chamber of a draw-off valve the inlet and outlet ports of which are closed by poppet valves seated against the inside of the wall of said chamber, comprising supplying a gas to said chamber the pressure of which normally closes said poppet valves, opening said draw-off valve by pushing the poppet valve closing said outlet port into said valve thus releasing the pressure of said gas in said chamber permitting said fluid to enter upon said chamber through said inlet and to pass therethrough, and shutting off the supply of said gas to said chamber simultaneous to said opening.

9. The method of controlling the dispensation of a fluid supplied at a predetermined pressure through the chamber of a draw-off valve the inlet and outlet ports of which are closed by poppet valves seated against the inside of the wall of said chamber, comprising supplying a gas to said chamber the pressure of which exceeds the pressure at which said fluid is supplied and normally closes said poppet valves, opening said draw off valve by pushing the poppet valve closing said outlet port into said valve thus releasing the pressure of said gas in said chamber permitting said fluid to enter upon said chamber through said inlet and to pass therethrough, and shutting off the supply of said gas to said chamber simultaneous to said opening.

Signed at Hoboken in the county of Hudson and State of New Jersey this 11th day of April, A. D. 1929.

CARL J. WILLENBORG, Jr.